United States Patent
Koch et al.

[11] Patent Number: 5,868,376
[45] Date of Patent: Feb. 9, 1999

[54] METHODS AND APPARATUS FOR CONTROLLING FLOW OF MATERIAL PAST A FLAP VALVE

[75] Inventors: Martin Koch, Neuenburg/Baden; Günter Untch, Müllheim/Baden, both of Germany

[73] Assignee: GEI GmbH, Deutschland, Germany

[21] Appl. No.: 954,608

[22] Filed: Oct. 20, 1997

[30] Foreign Application Priority Data

Oct. 18, 1996 [DE] Germany ............. 196 42 969.2

[51] Int. Cl.[6] .................................................. F16K 1/228
[52] U.S. Cl. .......................................... 251/161; 251/205
[58] Field of Search .................................. 251/161, 173, 251/205, 306

[56] References Cited

U.S. PATENT DOCUMENTS

| 1,813,126 | 7/1931 | Sheppard | 251/173 |
| 4,138,090 | 2/1979 | Summer et al. | 251/173 X |
| 5,540,266 | 7/1996 | Grau et al. | |

FOREIGN PATENT DOCUMENTS 44 40 895  5/1996  Germany.

*Primary Examiner*—John Fox
*Attorney, Agent, or Firm*—Burns, Doane, Swecker & Mathis, L.L.P.

[57] ABSTRACT

A proportioning mechanism for controlling a gravitational discharge of flowable material through a passage formed of a sealing material. The mechanism includes a rotatable flap valve mounted in the passage for movement in a first range of movement while in contact with the sealing material, and a second range of movement while out of contact with the sealing material. In the second range, a free flow of material is established. The free flow is terminated when only a small amount of material is yet to be discharged in order to achieve the desired discharge weight. At that time, the flap valve is rotated to a position in contact with a flexible portion of the sealing material. Fluid pressure in a cavity situated adjacent that flexible portion is varied to oscillate the flexible portion into and out of contact with the flap valve. When the flexible portion is out of contact with the flap valve, a gap is formed which admits passage of a small amount of material.

11 Claims, 1 Drawing Sheet

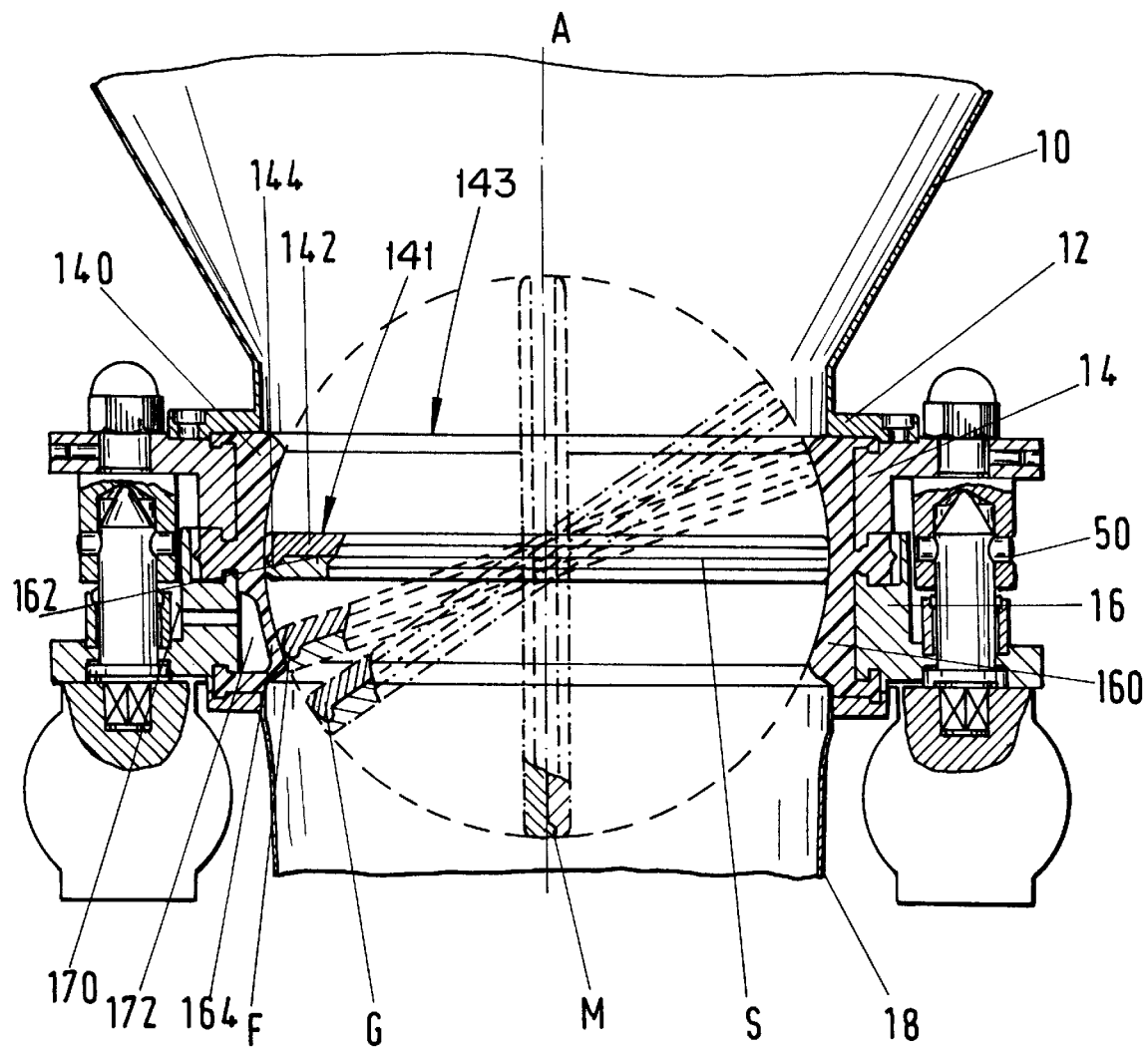

METHODS AND APPARATUS FOR CONTROLLING FLOW OF MATERIAL PAST A FLAP VALVE

BACKGROUND OF THE INVENTION

The invention relates to a proportioning device with a proportioning pipe in which a flap valve is disposed that can be shifted from its off-position, in which it is arranged mainly transverse to the longitudinal center axis of the proportioning pipe, into an on-position, in which it is arranged mainly parallel to the longitudinal center axis of the proportioning pipe. The invention also relates to an apparatus and method of controlling the discharge of flowable material.

Devices that are designed according to the principle disclosed above are known, for example, from German Document 44 40 895-C1. They are used to create a coupling connection between two containers, wherein material contained in one of the containers is transferred into the other container. For this process, it is often necessary to meter the amount to be transferred more or less exactly.

Proportioning slides or proportioning screws are used for this purpose, which are supposed to set a gap for the material running off from the product container. These proportioning devices are additional components and thus susceptible to failure, which also require time-consuming cleaning.

An object of the invention is to provide a proportioning device of the above mentioned type that allows fine proportioning without extensive design requirements.

SUMMARY OF THE INVENTION

This object is accomplished by means of a flow control apparatus for controlling a discharge of flowable material from a source of flowable material. The apparatus comprises a passage adapted to communicate with the source, the passage being defined by a wall which includes a flexible portion. A closure element is mounted for movement in the passage to a metering position in contact with the flexible portion of the wall. Means is provided for oscillating the flexible portion into and out of contact with the closure element to permit a discharge of the flowable material through a gap formed between the closure element and the flexible portion while the flexible portion is out of contact with the closure element.

The invention also relates to a method of controlling a discharge of flowable material through a valved passage. The valved passage comprises a passage wall and a closure element mounted for movement within the passage. The method comprises the steps of:

A) moving the closure element to a metering position in contact with a flexible portion of the wall; and B) oscillating the flexible portion of the wall repeatedly into and out of contact with the closure element to permit a discharge of the flowable material through a gap formed between the flexible portion and the closure element while the flexible portion is out of contact with the closure element.

According to the invention, the proportioning pipe exhibits seals in respective axial segments of the pipe at the inner circumference thereof. The seal contour facing the longitudinal center axis of the pipe is designed such that it corresponds to the trajectory of the flap valve's outer circumference by means of a preset setting range of the flap valve from its off-position to an open position wherein it at least partly unblocks the diameter of the proportioning pipe. At least one of the seals in the region at the end of the preset range can be oscillated, wherein the seal intermittently retreats from the outer circumference of the flap valve during the oscillatory motion. At the end of the preset range of the flap valve, a gap is formed during the oscillatory motion, through which gap the material that has to be metered can exit. The metered amount of material is determined by the frequency, duration and amplitude of the oscillatory motion. This allows for very precise fine proportioning.

According to an advantageous embodiment of the proportioning device, wherein the proportioning pipe and the flap valve exhibit a mainly circular cross-section, it is intended that the contour of each seal facing the longitudinal center axis of the proportioning pipe is in the shape of a spherical sector.

If the flap valve for proportioning is only moved in one direction, it is sufficient if the seals have a contour facing the longitudinal center axis which is configured point-symmetrically to the rotation axis of the flap valve.

If the flap valve is supposed to be rotatable in two directions, however, it is practical for the seal or seals to have a contour facing the longitudinal center axis which (is) are configured mirror-symmetrically to the axis of rotation of the flap valve.

In order to oscillate the mentioned flexible region of the seal, pulsed compressed air can be applied to the side of the seal facing away from the longitudinal center axis. As an alternative, the pulsed application of negative pressure is conceivable.

Finally, compressed air can be continuously applied to the oscillable region, which air would be intermittently dissipated by means of a flutter valve or similar apparatus to produce the oscillation.

According to the invention, it is only necessary to configure a seal that is present in many devices due to its type, such that the seal simultaneously provides a proportioning possibility. It is already known from German Document 44 40 895 to apply pneumatic pressure to seals; however, in this patent specification the pressure is used to tightly connect two connecting pipe sleeves with each other.

BRIEF DESCRIPTION OF THE DRAWING

Hereafter, the invention is explained in detail based on the attached drawing. The sole FIGURE of the drawing shows a sectional view through a longitudinal plane containing the longitudinal center axis of a proportioning pipe.

DETAILED DESCRIPTION OF A PREFERRED EMBODIMENT OF THE INVENTION

In the drawing, a funnel-shaped container 10 is connected with a first connecting pipe sleeve 14 by means of a ring flange 12, which connecting pipe sleeve forms a proportioning pipe together with a second connecting pipe sleeve 16 according to the present invention. The two connecting pipe sleeves 14, 16 each carry at their inner wall a seal element 140, 160, which together form a seal structure as will be disclosed in detail hereafter. Furthermore, a closing element in the form of a flap 141 is mounted in a passage 143 formed by inner walls of the seal elements 140, 160. The flap 141 is formed by two disks 142, 162, with the disk 142 including a projection 144 fitting into a recess of the disk 160 to form a seal therebetween. These disks 142, 162 are disclosed in detail in German Document 43 42 962, whereby only one of closing disk, is driven by a swiveling actuator (not shown), and that disk entrains the other disk 142, (i.e., a passive disk) for swiveling movement.

In order to join the two connecting pipe sleeves 14, 16 in the optimum position, centering devices are provided, which will not be disclosed herein in detail. A floating mount 18 is placed on connecting pipe sleeve 16.

The flap valve 141 formed by disks 142, 162 is shown in four positions, namely in off-position S, on-position M, gross proportioning position G and fine proportioning or metering position F.

Seals 140, 160 are mounted to respective connecting pipe sleeves 14, 16 in a known manner, and include contour surfaces facing a longitudinal center axis A of the passage 143, the surfaces being configured mirror-symmetrically to the axis of rotation of the flap 141. The outer edge of the flap valve 141 corresponds in shape to the contour of the wall of the seals 140, 160, whereby the cross-section of the passage 143 is blocked by means of a certain adjusting range of movement of the flap valve 141, namely counter-clockwise from off-position S to the fine proportioning position F, or by a certain clockwise adjusting range. During these adjusting ranges of movement, the outer periphery of the flap valve 141 contacts the wall of the seal structure 140, 160. Only when the preset clockwise or counter-clockwise adjusting range (each shown as an angle of rotation of approx. 20° in the exemplary embodiment) is exceeded, is the cross-section of the proportioning pipe at least partly unblocked. That is, the flap valve is also movable within a range of movement wherein it is out of contact with the wall of the seal structure.

Seal element 160 includes a flexible wall portion 164, which is designed as thin-walled in comparison to the remaining portions of the seal elements and which can be oscillated into and out of contact with the flap valve. For this purpose, compressed air is passed pulsingly into a hollow chamber 172 disposed behind (i.e., radially outside of) the oscillable region flexible portion 164 from a compressed air device (not shown in the drawing) through a pipe line 170. Thus, if the flap valve 141 is in the fine proportioning position F, a gap, through which the material to be metered can pass, is repeatedly formed between this flap valve and the flexible portion 164 during the oscillation. Instead of pulsing compressed air, pulsed negative pressure can be continuously fed to hollow chamber 172, and the hollow chamber 172 can be repeatedly vented through a flutter valve (not shown in the drawing), thus resulting in the desired oscillation of the flexible portion 164. Other ways of pulsing an air pressure will be appreciated by those skilled in the art.

Whenever material is supposed to be drawn off, flap valve 141 is first put into maximum pass-through position M. Before the amount to be metered is drawn off, flap valve 141 is put into gross proportioning position G, for example, by conventional means responding to a signal from a scale, which position, in the exemplary embodiment, is offset by 30° in reference to off-position S. In this gross proportioning position G, in which the diameter of the proportioning pipe is only partly unblocked, the proportioning process is continued, until the flap valve 141, again in response to a signal from a scale, is transferred to the fine proportioning position F at such time that only a small remaining amount of the material still needs to be discharged to achieve the desired discharged weight. By then oscillating the flexible wall portion 164, that small remaining amount of material is drawn off finely through the gap intermittently formed between seal element 160 and flap valve 141. The dispensing of that remaining amount can be precisely regulated by controlling the duration, frequency and amplitude of the oscillation.

No transfer of material is possible in the range between off-position S and fine proportioning position F if flap valve 141 is swiveled clockwise. The size of this angle range mainly depends on the design of oscillable flexible portion 164 and the material of seal 160 and thus need not be restricted to angular values of ±20°. Gross proportioning position G, for example, will be chosen depending on the pourability of the material to be metered.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A proportioning apparatus for controlling a discharge of flowable material through a proportioning pipe, comprising:
   a proportioning pipe in which there is disposed a wall formed by sealing material;
   a flap valve movably mounted within the pipe for movement in a first range of movement in contact with the wall, and a second range of movement out of contact with the wall, the flap valve being movable in the first range between a closed state in contact with a first portion of the wall, and a metering state in contact with a second, flexible portion of the wall; and
   oscillating means for oscillating the flexible port-on repeatedly into and out of contact with the flap valve to permit a discharge of the flowable material between the flap valve and the flexible portion while the flexible portion is out of contact with the flap valve.

2. The proportioning apparatus according to claim 1 wherein the pipe defines a longitudinal axis, the flap valve extending perpendicular to the axis in the closed state, the flap valve movable in the second range into a position substantially parallel to the axis.

3. The proportioning valve according to claim 1 wherein the flap valve is rotatable about an axis of rotation extending perpendicular to a longitudinal axis of the pipe, the wall including a surface configured to conform to a shape of an outer periphery of the flap valve, the outer periphery being in contact with the surface during movement thereof in the first range.

4. The proportioning apparatus according to claim 3 wherein the surface comprises a sector of a sphere, the outer periphery being correspondingly shaped.

5. The proportioning apparatus according to claim 3 wherein the surface is symmetrical with respect to the axis of rotation of the flap valve.

6. The proportioning apparatus according to claim 1 wherein the oscillating means comprises a hollow chamber disposed outside of the flexible portion, and a passage for communicating the hollow chamber with a source of fluid pressure, including means for varying the pressure.

7. The proportioning apparatus according to claim 1 wherein the source of variable pressure comprises a variable positive pressure source.

8. The proportioning apparatus according to claim 1 wherein the source of variable pressure comprises a variable negative pressure source.

9. The proportioning apparatus according to claim 1, further including a container containing the flowable material, the proportioning valve extending downwardly from the container to conduct a gravitational flow of the material.

10. A flow control apparatus for controlling a discharge of flowable material from a source of flowable material, the apparatus comprising:
    a passage adapted to communicate with the source, the passage defined by a wall which includes a flexible portion;

a closure element mounted for movement in the passage to a metering position in contact with the flexible portion of the wall; and means for oscillating the flexible portion into and out of contact with the closure element to permit a discharge of the flowable material through a gap formed between the closure element and the flexible portion while the flexible portion is out of contact with the closure element.

11. A method of controlling a discharge of flowable material through a valved passage, the valved passage comprising a passage wall and a closure element mounted for movement within the passage, the method comprising the steps of:

A) moving the closure element to a metering position in contact with a flexible portion of the wall; and B) oscillating the flexible portion of the wall repeatedly into and out of contact with the closure element to permit a discharge of the flowable material through a gap formed between the flexible portion and the closure element while the flexible portion is out of contact with the closure element.

* * * * *